United States Patent [19] | [11] 4,110,137
Beach | [45] * Aug. 29, 1978

[54] COMPOSITION FOR FILLING CABLES

[75] Inventor: Shirley Beach, North Vancouver, Canada

[73] Assignee: Phillips Cable Limited, Brockville, Canada

[ * ] Notice: The portion of the term of this patent subsequent to Jun. 1, 1993, has been disclaimed.

[21] Appl. No.: 676,991

[22] Filed: Apr. 14, 1976

Related U.S. Application Data

[63] Continuation-in-part of Ser. No. 428,757, Dec. 27, 1973, Pat. No. 3,961,128.

[30] Foreign Application Priority Data

Dec. 29, 1972 [CA] Canada .................................. 160290

[51] Int. Cl.2 .............................................. H02G 15/20
[52] U.S. Cl. .................................... 156/48; 174/23 C
[58] Field of Search ...................... 156/48; 208/20, 21; 106/270, 272; 260/28; 174/23 C, 23 R, 116, 25 R, 25 C

[56] References Cited

U.S. PATENT DOCUMENTS

| | | | |
|---|---|---|---|
| 3,683,104 | 8/1972 | Woodland et al. ................ | 174/25 C |
| 3,775,548 | 11/1973 | Zinzer, Jr. ......................... | 174/23 C |
| 3,875,323 | 4/1975 | Bopp et al. ......................... | 174/23 C |
| 3,893,961 | 7/1975 | Walton et al. ................. | 174/23 C X |
| 3,961,128 | 6/1976 | Beach ................................ | 174/23 C |

FOREIGN PATENT DOCUMENTS

| | | | |
|---|---|---|---|
| 995,582 | 6/1965 | United Kingdom .................. | 174/25 C |

*Primary Examiner*—Arthur T. Grimley
*Attorney, Agent, or Firm*—Charles E. Brown

[57] ABSTRACT

A composition useful for filling communication cables is described which comprises petroleum jelly and a small amount of siliceous material which renders the petroleum jelly viscous at elevated temperatures, and prevents leakage of the petroleum jelly from a cable having a flaw, which is subjected to elevated temperatures; the composition is particularly useful in communication cables having cellularly insulated conductors where migration of the flowable filler composition into the cellular insulation is diminished.

14 Claims, 5 Drawing Figures

WEIGHT UP-TAKE BY CELSEAL INSULATION OF THREE FILLING COMPOUNDS AT 70°C

DUSSEK 2852
IMPERIAL QS-3091 E
DUSSEK 3215
DAYS AGED
0
50
100
150
200
250
300
350
400
WEIGHT UP-TAKE (MILLI-GRAMS)(6 FEET)
0
100
200
300
400
500
600
700
WEIGHT UP-TAKE (PERCENT OF POLYETHYLENE)
10
20
30
40
50
60
70

COMPOSITION FOR FILLING CABLES

CROSS-REFERENCE TO RELATED APPLICATION

This application is a Continuation-in-part of U.S. patent application Ser. No. 428,757, filed Dec. 27, 1973, now U.S. Pat. No. 3,961,128 issued June 1, 1976.

BACKGROUND OF THE INVENTION (a) Field of the Invention

This invention relates to a composition for filling communications cables, a communication cable containing the composition, a method of making the composition and a method of making a communication cable.

(b) Description of Prior Art

Communication cables generally comprise a plurality of conductors which may or may not be individually or collectively insulated and which may or may not include a core, enclosed within a waterproof sheath; the interstices between the conductors and between the conductors and the sheath being filled from end to end of the cable length with a water-impervious medium. The water-impervious medium should not drain under the influence of gravity or such hydrostatic pressure as may arise in the event of damage to the cable sheath, as this would leave an incompletely filled cable along which moisture might travel and the medium should further permit relative sliding movement of the conductors over one another during such bending of the cables as occurs during manufacture and installation of the cable.

A preferred water-impervious medium is petroleum jelly, however, petroleum jelly has a tendency to seep from the cable ends or from a flaw developed in the cable, at elevated temperatures to which the cable might be subjected in installation or in use particularly in warm climates.

Various attempts have been made to overcome this disadvantage of petroleum jelly. Compositions comprising petroleum jelly with the addition of micro-crystalline waxes and low molecular weight polyethylene resin have partially solved the problem, by rendering the petroleum jelly firm at room temperatures of the order of 20° C; and reducing the mobility of the petroleum jelly at higher temperatures of the order of 70° C sufficiently to prevent any substantial seepage of the petroleum jelly from the cable.

These compositions, however, are not entirely successful because the petroleum jelly and the wax and resin are not entirely compatible and there is a tendency for them to separate, particularly during the filling process which may involve sustained high temperatures accompanied by mechanical shearing.

Further in cables in which the conductors are electrically insulated with a cellular insulation, such as cellular polyethylene, there is a tendency for the filler composition to migrate into the cellular insulation and the petroleum jelly may itself swell the carcass of the cells of the cellular insulation. In the case of cellular insulating materials, for example, cellular polyethylene, this migration may continue until the cells of the insulating material are filled. The filling of the cells affects the electrical properties of the cable particularly the capacitance.

It is an object of the present invention to provide a composition suitable for filling telecommunication cables which will overcome the aforementioned problems.

It is a further object to provide communication cables, particularly telecommunication cables contain the composition.

It is a further object of the invention to provide a method of making a composition which will overcome the aforementioned problems.

It is a further object of the invention to provide a method of making a communication cable, particularly telecommunication cables containing the composition.

SUMMARY OF THE INVENTION

It has now been found that the addition of a small amount of siliceous material such as diatomaceous earth to a petroleum jelly produces a stable composition suitable for filling communication cables, which satisfies the seepage requirements of such cables.

Further it has been found that the inclusion of small amounts of siliceous material in the petroleum jelly results in a filling composition in which migration of the petroleum jelly based filler composition into a cellular material is considerably reduced, particularly in comparison with the conventional petroleum jelly filler compositions containing micro-crystalline waxes. The invention thus provides for the production of a communication cable having cellularly insulated conductors of stable electrical properties.

Siliceous materials such as diatomaceous earth are compatible with the petroleum jelly and increase the viscosity of the petroleum jelly at high temperatures. Siliceous materials have the further advantages that they are relatively inert, they are very poor conductors of electricity and they do not disturb the electrical properties of the petroleum jelly.

As a further point it is found that the small amount of siliceous material does not significantly alter the viscosity of petroleum jelly at room temperatures and lower temperatures so that the presence of the siliceous material does not render the petroleum jelly brittle at low temperatures; this is significant inasmuch as the cable may be used in areas which are subject to extremes of temperature conditions.

According to the invention a composition for filling communication cables comprises petroleum jelly and siliceous material in an amount effective to render the petroleum jelly viscous at elevated temperatures, the siliceous material being substantially uniformly distributed throughout the petroleum jelly.

According to another aspect of the invention a method of making a composition for filling communication cables comprises mixing siliceous material with a liquid vehicle compatible with petroleum jelly to form a concentrate of siliceous material in said vehicle, adding said concentrate to petroleum jelly in an amount to provide an amount of siliceous material effective to render the petroleum jelly viscous at elevated temperatures, and mixing to uniformly distribute said siliceous material in said petroleum jelly.

According to another aspect of the invention in a method of making a communication cable wherein the improvement comprises providing a plurality of conductors surrounded by a sheath and filling the interstices between individual conductors and between the conductors and the sheath with a composition comprising petroleum jelly and siliceous material in an amount effective to render the petroleum jelly viscous at elevated temperatures, the siliceous material being uniformly distributed throughout the petroleum jelly.

According to another aspect of the invention a method of reducing migration of a petroleum jelly filler composition into cellular insulation in a communication cable comprises incorporating in the filler a siliceous material in an amount of 2 to 6%, by volume, of the petroleum jelly.

According to a still further aspect of the invention there is provided a method of stabilizing the electrical properties of a communication comprising a plurality of conductors surrounded by a sheath wherein the conductors are electrically insulated with a cellular insulating material, which method comprises filling the interstices between the individual cellularly insulated conductors and between the cellularly insulated conductors and the sheath with a filling composition comprising petroleum jelly having a siliceous material dispersed therein in an amount of 2 to 6%, by volume, of the petroleum jelly.

According to yet another aspect of the invention there is provided in a method of making a communication cable comprising providing a plurality of electric conductors surrounded by a sheath wherein the conductors are electrically insulated with a cellular insulating material, and filling the interstices between the cellularly insulated conductors and the sheath with a filling composition, the improvement wherein said filling composition comprises petroleum jelly having a siliceous material dispersed therein in an amount of 2 to 6%, by volume, of the petroleum jelly.

The invention further provides an improved communication cable of stabilized electrical and physical properties wherein the conductors of the cable are electrically insulated with a cellular insulating material and the cable is filled with a filling composition comprising petroleum jelly having a siliceous material dispersed therein in an amount of 2 to 6%, by volume, of the petroleum jelly.

FILLER COMPOSITION

In this specification, petroleum jelly includes synthetic petroleum jelly, and naturally occurring petroleum jelly and mixtures of the two.

Synthetic petroleum jelly is well known and is generally obtained by mixing various heavy petroleum lubricating oils with a low melting point paraffin wax.

Naturally occurring petroleum jelly is well known and is generally defined as comprising a purified mixture of semi-solid hydrocarbons obtained by the distillation of high boiling petroleum fractions and having a density in the range of about 0.81 to 0.88 at 60° C and a melting point of between 38° and 60° C as derived by fractional distillation of still residues from the steam distillation of paraffin-base petroleum, or from steam-reduced amber crude oils; the latter being oils from which the light fractions have been removed.

Siliceous material in this specification includes diatomaceous earth, colloidal silica, pyrogenic silica, silica aerogel and similar silica containing siliceous materials having a relatively large surface area to mass ratio.

By way of example one suitable siliceous material is that sold under the trademark CAB-O-SIL by the Cabot Corporation. CAB-O-SIL is described as a colloidal silica consisting of submicroscopic particles averaging in diameter by grade from 70 to 140 angstroms, sintered together in chain-like formations, the chains being branched and having surface areas of 50 $m^2/g$ to 400 $m^2/g$ depending on the grade. Grades having surface areas of 200 $m^2/g$ to 400 $m^2/g$ are preferred.

The amount of siliceous material added to the petroleum jelly should be effective to render the petroleum jelly viscous at elevated temperatures at which the petroleum jelly would otherwise be fluid. The elevated temperatures envisaged would not generally be higher than about 85° C and for most purposes an amount of siliceous material effective to render the petroleum jelly viscous at 80° C is satisfactory.

An amount of siliceous material of the order of about 2% volume to 4% by volume of the petroleum jelly has provided satisfactory viscosity in petroleum jelly at 80° C.

It is found to be convenient to measure the quantities by volume rather than by weight, however, on a weight basis a suitable amount of siliceous material would be 1% to 6% by weight based on the weight of the petroleum jelly.

Further in the embodiment in which the petroleum jelly composition is employed in a cable having cellularly insulated conductors the amount of siliceous material added to the petroleum jelly is an amount which is effective to reduce the mobility of the petroleum jelly at temperatures up to about 70° C and to avoid the problem of migration of the filler composition into the cellular insulation at temperatures at which the cable might be subjected to during use, as compared with more conventional fillers based on petroleum jelly containing micro-crystalline waxes as the additive.

The fact that testing was done at 70° C was done to magnify the difference shown by different filling materials; it is not intended to suggest that cables operate at 70° C.

It is found that mobility of the petroleum jelly is appropriately reduced and the problem of migration experienced with the more conventional filling compositions is largely overcome even at temperatures as high as 70° C which would be a severe temperature for cable use and which probably represents an upper limit of temperatures to which the cable might be subjected. Of course, in many environments, temperatures as high as 70° C would never be encountered. However, there are hot countries in the world where cables might be subjected to such high temperatures, particularly if left in storage for prolonged periods under a hot sun.

In practice amounts of siliceous material of the order of about 2% by volume to 6% by volume and preferably 2 to 4% by volume of the petroleum jelly have proved satisfactory with cellular insulation even at temperatures as high as 70° C. A particularly preferred content of silceous material is about 3% by volume of the petroleum jelly.

The filling composition of the invention may optionally include additives conventionally used in cable filling composition, for example, oxidation inhibitors, e.g. phenyl-β-naphthylamine and metal deactivators, e.g. NN'-disalicylidene ethylene diamine. Suitable amounts of such compounds are up to 0.2% by weight of the composition of the oxidation inhibitor and up to 0.02% by weight of the composition of the metal deactivator.

THE CABLE

In the manufacture of cables having a filling of the composition of the invention the sheath is suitably an aluminium tape which is preferably applied longitudinally or helically about the plurality of conductors such that contiguous margins overlap and can be bonded together. The individual conductors are preferably insulated by coating them with a plastics material preferably of cellular form.

The interstices between the individual conductors and between the conductors and the sheath may be filled with the composition before the edges of the sheath are bonded together.

The aluminium sheath provides an electrical shield for the conductors and is impervious to petroleum jelly. A jacket of polyethylene may be extruded around the aluminium sheath in a conventional manner as desired.

The sheath could also comprise other material, for example, polyethylene tape, however, this has the disadvantage of being pervious to the petroleum jelly and the possibility exists of the composition migrating in certain conditions into and under the polyethylene sheath, thus creating an incompletely filled cable along which moisture may travel.

The waterproof sheath may be of a metallic nature or of plastics material and may take any convenient form but it preferably comprises an extruded body of plastics material. Between the core of insulated conductors and the waterproof sheath there may be provided a screen or water barrier comprising a longitudinally applied metallic tape which is folded transversely about the core with an overlapped seam. Preferably one or each major surface of the metallic tape is coated with a plastics material and the metallic tape is so applied to the core that its outermost surface is plastics coated and is bonded to the extruded plastics sheath.

In the embodiment in which the conductors are cellularly insulated the cellular insulation may be any of those cellular insulations conventionally used in communication cables and which permit the migration of conventional petroleum jelly filler composition thereinto. Preferred cellular insulations are polyolefins, for example, polyethylene and polypropylene with polyethylene being a preferred insulator.

Such cellular insulators suitably have a cell diameter of from 10 to 30$\mu$ (microns); a typical cell diameter being 20$\mu$ (microns). The volume of the cellular insulator which is composed of the cells will suitably be in the range from 15 to 60%; and suitably about 25% by volume of the cellular insulator will comprise the cells.

In the case where the conductors of the cable are individually insulated with cellular insulation the thickness of the insulation will generally be in the range of 0.07 to 0.4 mm and preferably from 0.11 to 0.33 mm. In such an insulation the cells will be in the interior of the insulation, the cellular insulation having an outer solid skin in contact with the petroleum jelly filling composition which may be from 1 to 3 mil.

It has also been found that employment of a cable filling comprising petroleum jelly and a small amount of siliceous material reduces migration of filler composition into non-cellular solid insulators such as low or medium density polyethylene, however, the problem of filler migration in such non-cellular insulators is much less serious.

Initially migration of the petroleum jelly filler composition into a cellular insulating material proceeds at the same rate as into a non-cellular, solid form of the same insulating material. This is presumably due to the fact that initially the filling composition has to migrate through a skin of the solid insulating material before reaching the outer cells.

MANUFACTURE OF COMPOSITION

In the method of the invention for preparing the composition, the well known masterbatch technique is found to be suitable. In this technique the siliceous material is subjected to an intensive mixing, preferably in an Ink Mill or Ball Mill, with a liquid vehicle having high surfactant or wetting properties and which is compatible with the petroleum jelly.

The intensive mixing produces a concentrate which is then mixed into the petroleum jelly to produce a composition in which the siliceous material is uniformly distributed throughout the composition.

A suitable liquid vehicle is polybutene, however, other liquid vehicles having the requisite wetting and compatibility properties can also be used. Suitably the siliceous material is added to polybutene in an amount of about 30 parts by weight siliceous material to 70 parts by weight polybutene.

While the preparation of the compositions has been described with reference to the preferred method, wherein a concentrate of siliceous material in a liquid vehicle is formed for addition to the petroleum jelly, it will be appreciated that the siliceous material could be added directly to the petroleum jelly without the aid of the liquid vehicle or the petroleum jelly itself could be used as the liquid vehicle.

MANUFACTURE OF CABLE

In the method of making the communication cable the compositions may be introduced into the cable by a vacuum impregnation process as a final step in the manufacture of the cable. Generally, however, it is preferred to introduce the composition as the cable is being manufactured, for example, as a step preceding or immediately following the application of each layer of conductors or pairs or quads to the underlying assembly of conductors, pairs or quads. In the latter case, the composition of the invention may be introduced into the cable at a die, which is modified to provide an annular space allowing the material to flow completely around each layer of conductors. Excess compositions may be removed by a snuggering die and an insulating tape, for example, of paper, may be wound around the outer layer of conductors.

In another embodiment pairs of conductors, preferably insulated, may be passed into a flooding tank into which the composition of the invention is pumped; the composition is thus applied to each of the conductors as they twist about each other more closely. The conductors then pass into a wiping die that compresses the hitherto slightly separated, but composition covered conductors and removes excessive composition from the conductors. A sheath may then be wrapped about the conductors.

BRIEF DESCRIPTION OF DRAWINGS

The invention is illustrated with reference to the accompanying drawings, in which.

DESCRIPTION OF PREFERRED EMBODIMENTS

Figure 1:
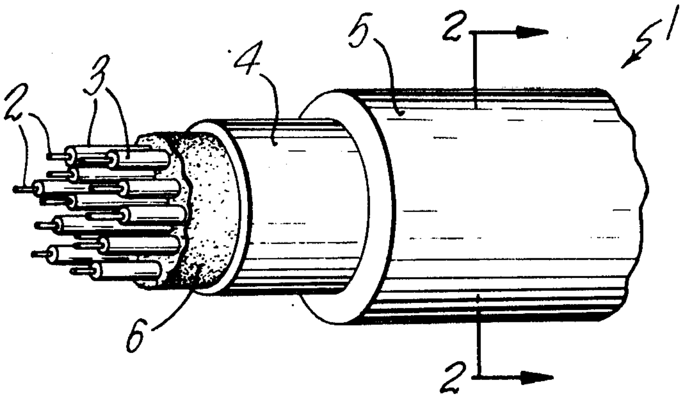
FIG. 1 schematically represents a communication cable part cut away.
Figure 2:
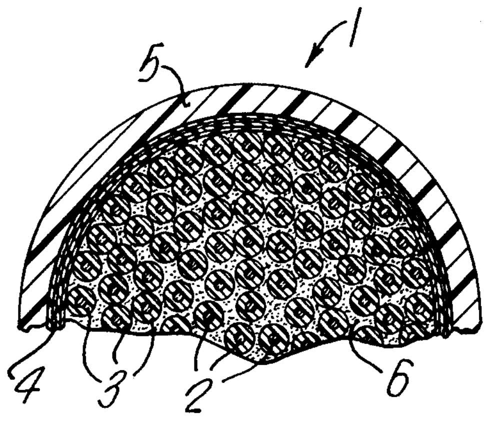
FIG. 2 is an exploded cross-section part cut away on line 2—2 of FIG. 1.

With reference to the drawing a communication cable 1 comprises a plurality of copper conductors 2 each having an insulating coating 3 of polyethylene which may be cellular in form. A sheath 4 of aluminium tape is wrapped longitudinally about the conductors 2 to form a complete envelope; and an extruded jacket 5 of polyethylene surrounds the sheath 4.

The interstices between the individual insulated conductors 2 and between the conductors 2 and the sheath 4 are filled throughout the length of the cable 1 with the water-impermeable medium 6, consisting of petroleum jelly containing 3% volume, by volume, of the petroleum jelly of CAB-O-SIL (trademark) thoroughly dispersed therein.

If required, the cable 1 may be provided with armouring (not shown) and protected against corrosion by an extruded over-sheath of, for example, polyvinyl chloride. EXAMPLES

EXAMPLE 1

A colloidal silica available under the trademark CAB-O-SIL was intensively mixed with polybutene (M.W. 400 to 1000 on the MECROLAB SCALE) in an amount of 30 parts by weight of CAB-O-SIL to 70 parts by weight of the polybutene in an Ink Mill to produce a concentrate. The resulting concentrate was added to petroleum jelly to provide 2% volume of CAB-O-SIL in the petroleum jelly and was intensively mixed therein to uniformly distribute the CAB-O-SIL throughout the petroleum jelly.

The resulting composition was used as a filler for a communication cable and no seepage occurred when the cable was subjected to heating to a temperature of 80° C.

EXAMPLE 2

CAB-O-SIL colloidal silica was added directly to petroleum jelly in an amount of 3% volume, by volume, of the petroleum jelly. The petroleum jelly with the CAB-O-SIL was subjected to an intensive mixing to distribute the CAB-O-SIL uniformly throughout the petroleum jelly.

The resulting composition was used as a filler for a communication cable and no seepage occurred when the cable was subjected to heating to a temperature of 80° C.

TESTS

Various tests were carried out on cellularly insulated conductors treated with different cable filling compositions including the one employed in the practice of the present invention. The results of the tests demonstrate the advantages obtained by practice of the invention.

In the tests described below cellularly insulated conductor wires were employed in which the cellular insulation was a medium density polyethylene in which the cells comprised 25% by volume; the outer diameter of the insulated conductor wires was 45.5 mils and the wall thickness of the cellular insulation was 10.1 mil.

The polyethylene employed in the manufacture of the insulated wires is available from Union Carbide under the manufacturer's designation U.C. 8890; this product includes a blowing agent which on heating decomposes to produce gas bubbles which form the cells. The cellular insulation can also be produced by the method described in U.S. Application Ser. No. 431,495 Shirley Beach, filed Jan. 7, 1974.

Three cable filling compositions were employed identified by the trademarks Dusseks 3215, Dusseks 2852 and Imperial E. Dusseks 3215 is the formulation employed in the practice of the present invention and comprises 4% by volume of CAB-O-SIL (trademark) in petroleum jelly. Dusseks 2852 comprises a base petroleum jelly with a relatively large content of micro-crystalline wax which conveniently is in the range of 15 to 35% by weight. Imperial E. comprises a petroleum jelly base with amorphous polypropylene as the additive.

In the following tests the test specimens (cellularly insulated conductors, as described above) were placed in pans and a large quantity of the filling composition was poured over them. After a predetermined immersion time the test specimen is removed from the pan and composition adhering to the surface of the specimen is removed by passing the specimen through a specially tooled die and the appropriate test carried out.

Test 1

Weight-uptake

The filling compositions migrate into the cellular insulation by differing amounts depending on the temperature, the immersion time and the nature of the filling composition. The type of polymer is also significant but in the present test this was not varied.

In order to determine the weight take-up six foot lengths of specimen wound into loose coils were employed. Each specimen was weighed before and after immersion and ten such results averaged to obtain a figure. The weighings were carried out after different periods of immersion at a temperature of 70° C.

Figure 3:
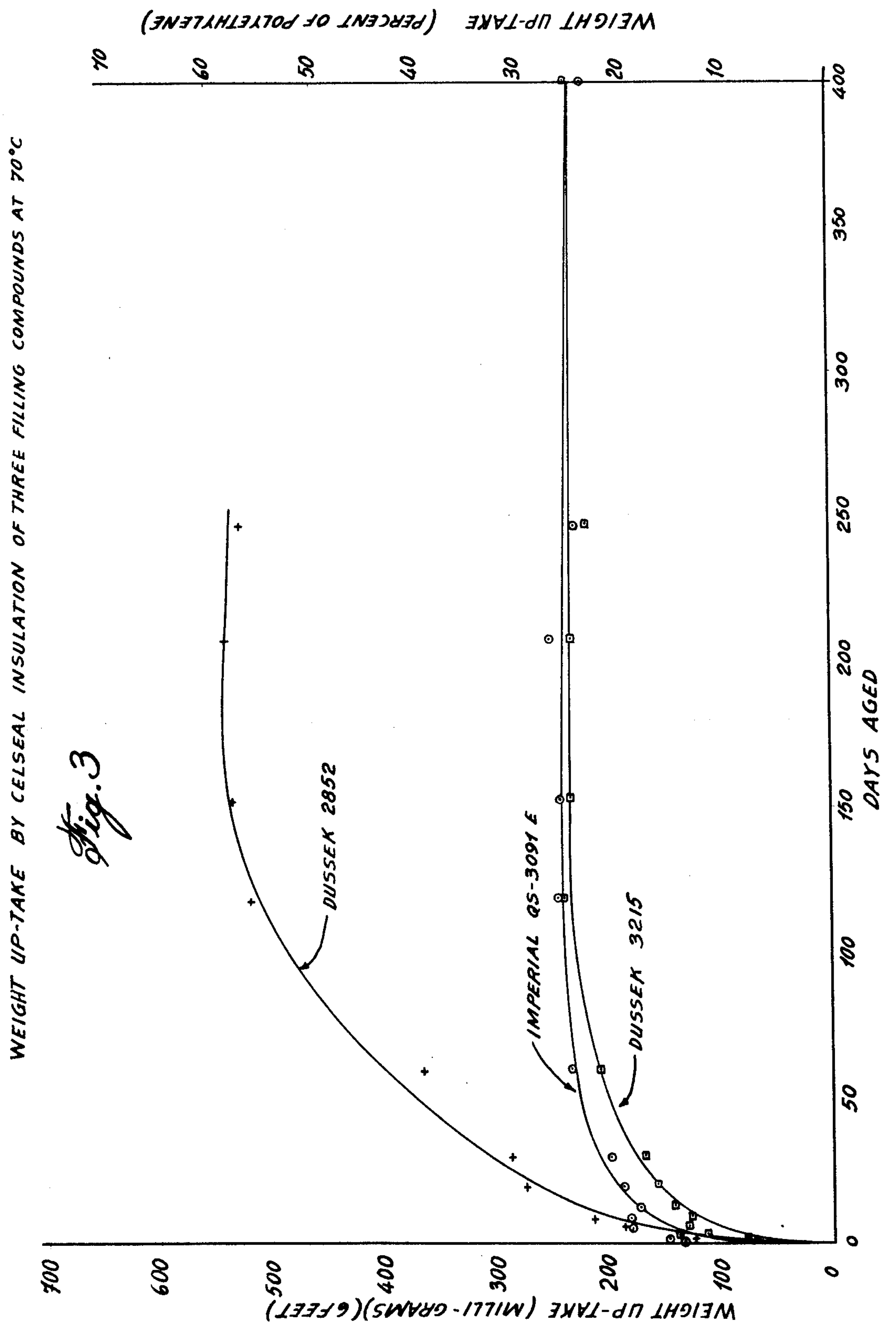
FIG. 3 illustrates graphically the weight take-up by cellular insulation of three cable filling compositions at 70° C.

The results for the three filling compositions are shown graphically in FIG. 3.

In the case of Dussek 2852 it would appear that maximum take-up (cell filling) is reached in about 150 days. It is also clear that while the other two fillings have penetrated the cellular insul to a certain extent, the degree of weight uptake has levelled off at a fraction of that with Dussek 2852.

It is apparent that a significant decrease in migration was obtained using Dussek 3215 according to the practice of the invention particularly when compared with Dussek 2852 which is widely used as a filling for communication cables.

Since 70° C is a farily severe temperature the tests were repeated at 60° C; the weight uptake in milligrams per 6 ft. with time is tabulated in Table I below from which it will be seen that the use of Dussek 3215 according to the present invention still shows a marked improvement.

TABLE I

| Time | Weight uptake (mg) at 60° C | | |
|---|---|---|---|
| | Filling Composition | | |
| Days | 2852 | Imperial E | 3215 |
| 94 | 190 | 150 | 130 |
| 150 | 250 | 190 | 170 |
| 225 | 270 | 185 | 155 |

TABLE I-continued

| Time | Weight uptake (mg) at 60° C | | |
|---|---|---|---|
| | Filling Composition | | |
| Days | 2852 | Imperial E | 3215 |
| 300 | 280 | 155 | 140 |

At 60° C the uptake levels off at about 150 mg in the practice of the present invention, although for Dussek 2852 weight uptake is continuing even after 300 days.

In this test the weighing was carried out using a Mettler H-8 (trademark) balance accurate to ± 0.5 mg.

Test 2

Swelling of Insulation

The swelling caused by exposure to the filling composition increased rapidly in the first few days and reached a constant state. Table II below summarizes the result.

TABLE II

| | Swelling (mils) - Increase in diameter | | |
|---|---|---|---|
| | Filling Composition | | |
| Temperature | 2852 | Imperial E. | 3215 |
| 60° C | 2.1 | 1.9 | 1.6 |
| 70° C | 2.3 | 1.8 | 1.9 |

Swelling of the insulation is significant since it affects the capacitance increase of the cable due to cell filling.

Test 3

Density Increase

Density increase is significant since it is an indicator of the degree of cell filling.

The initial and final densities were determined by an established method involving weighing the sample in air and then in water. The results were cross-checked by a different procedure by determining the ratio of weight to volume as calculated from the weight uptake and swelling data; the results of both methods were found to be in close agreement.

Figure 4:
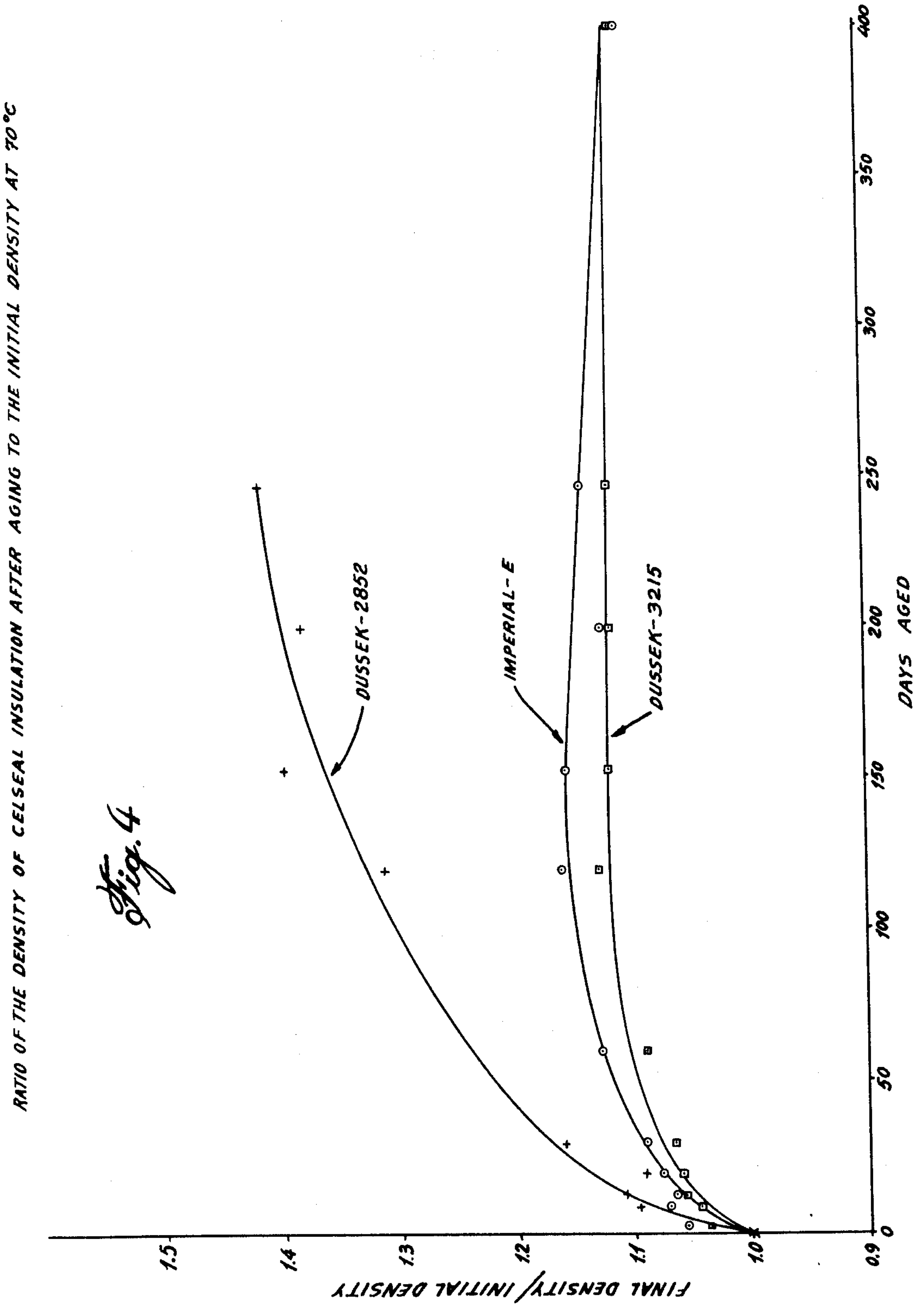
FIG. 4 illustrates graphically the increase in density of cellular insulation treated with three cable filling compositions after ageing at 70° C.

The results on the test specimens at 70° C are shown in FIG. 4. In the case of Dussek 2852 insulation density had increased by 40% after 250 days exposure at which point measurements were discontinued since complete cell filling had occurred. Density increase is significantly less in the practice of this invention.

The test was repeated at 60° C, at which temperature Dussek 2852 caused a density increase of 16% after 300 days whereas Dussek 3215, in the practice of the invention, caused an increase of only 3.5%.

Test 4

Trough Capacitance Change

The procedure for this test is similar to that for weight uptake. A specimen is pulled through filling compositions and a selected die and the coaxial or trough capacitance is measured. The specimen is then exposed to filling composition and the measurement repeated after prolonged periods of exposure.

Figure 5:
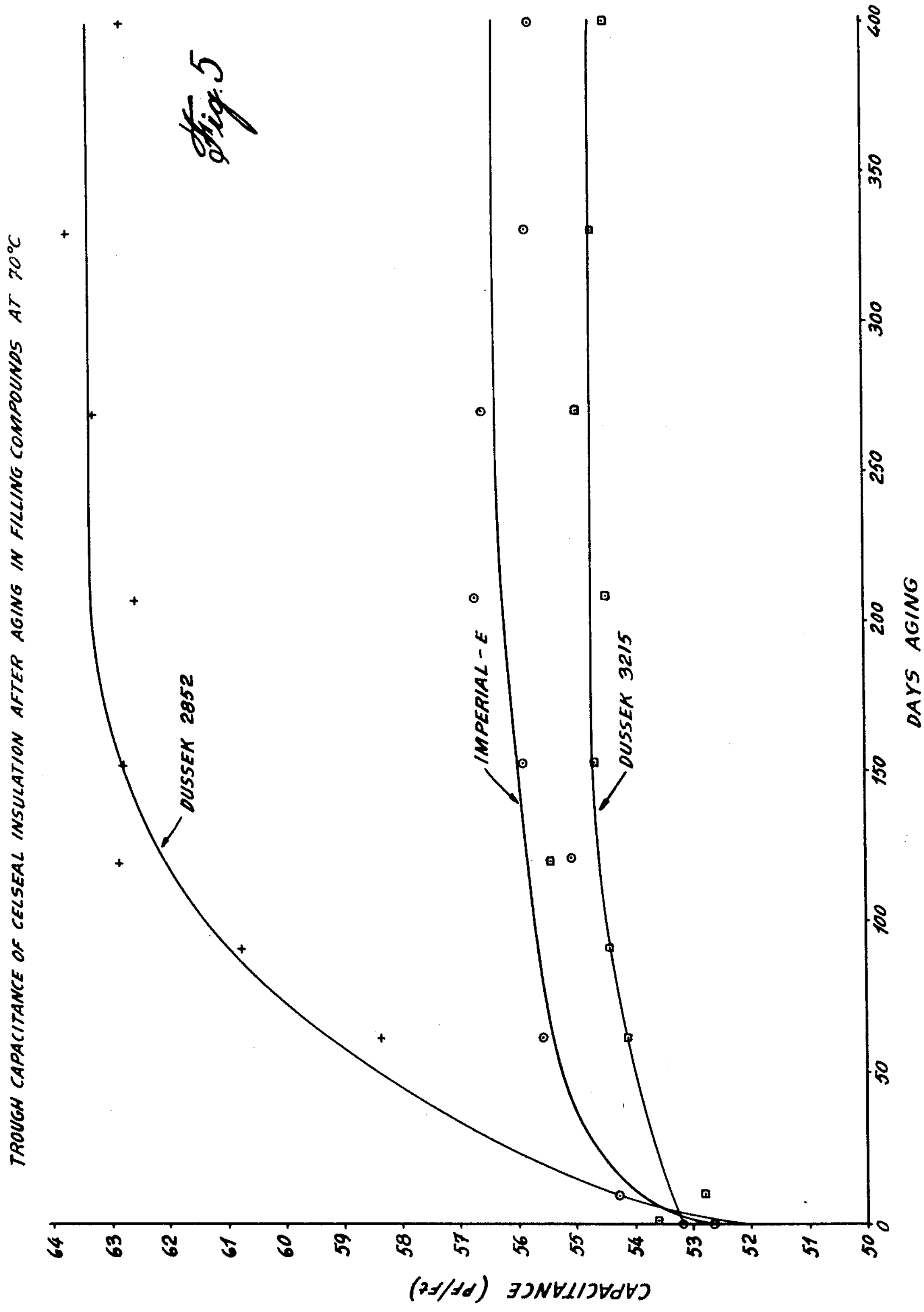
FIG. 5 illustrates graphically the variation in capacitance with time of cellular insulation treated with three cable filling compositions at 70° C.

The results at 70° C for the three filling compositions are shown in FIG. 5. A comparison with the figures obtained at 60° C is tabulated in Table III below.

TABLE III

| | Filling Composition | | |
|---|---|---|---|
| | Initial Capacitance/Final Capacitance in pF/foot | | |
| Temperature | 2852 | Imperial E | 3215 |
| 70° C | 52.0/62.7 | 52.8/56.3 | 53.1/54.7 |
| 60° C | 52.0/55.7 | 52.6/53.8 | 53.0/53.7 |

The results demonstrate a smaller change in coaxial or trough capacitance and hence an increase in electrical stability in the practice of the invention.

Test 5

Tensile Strength and Elongation

The tensile strength and elongation of specimens were measured after being exposed to the filling compositions for varying time periods. The exposed insulation was removed from the conductor by stretching the conductor and then stripping the insulation. The insulation was tested at 20 ins./min. and a percent retention based on initial unexposed results was determined. The results are tabulated in Table IV below.

TABLE IV

| | % Retention After Long Exposure Period | | | | | |
|---|---|---|---|---|---|---|
| | Filling Composition | | | | | |
| Temperature | 2852 | | Imperial E | | 3215 | |
| | T | E | T | E | T | E |
| 70° C | 90 | 58 | 93 | 72 | 97 | 73 |
| 60° C | 95 | 75 | 98 | 82 | 100 | 82 |

The results demonstrate that tensile strength is retained with all filling compositions although Dussek 3215 shows the best results. On the other hand, the drop in elongation is more significant with Dussek 2852 producting a drop to 58% of the initial value of 70° C compared with 73% in the practice of the invention.

A similar test was carried out using similar specimens in which the outer diameter was 45 mil and the wall thickness was 9.85 mil and wherein the cells of the insulations comprised 30% by volume.

Table V below shows the values for the tensile strength and elongation of the specimens at different time intervals after exposure to the filling composition at 70° C.

TABLE V

| | Ultimate Tensile Strength and Elongation at 70° C (Tensile/Elongation) | | |
|---|---|---|---|
| Time | Filling Composition | | |
| Days | 2852 | Imperial E | 3215 |
| 0 | 3452/457 | 3452/457 | 3452/457 |
| 1 | 3083/430 | 2967/430 | 3092/440 |
| 13 | 2881/374 | 2825/380 | 3016/387 |
| 60 | 2398/340 | 2688/390 | 2756/390 |
| 90 | 2600/300 | 2700/370 | 2850/370 |
| 120 | 2672/290 | 2963/360 | 2920/350 |
| 153 | 2588/270 | 2811/360 | 2704/330 |
| 208 | 2540/290 | 2760/370 | 2870/370 |

Like the results tabulated in Table IV, these results demonstrate the superior nature of cables made according to this invention particularly in comparison with cables employing micro-crystalline wax as additive (Dussek 2852) which is widely used.

The results of the tests described above demonstrate that by employing a filling composition according to the method of the present invention in a communication cable having cellular insulation of the conductors, improved stability is obtained; and this improves control of the manufacture of a communication cable having predetermined physical and electrical properties. It will be understood that communication cables are manufactured for long life, usually about 30 to 35 years, and it is thus important that the properties remain substantially uniform.

I claim:

1. In a method of making a communication cable the improvement comprising:

a. providing a plurality of conductors surrounded by a sheath, and b. filling the interstices between individual conductors and between the conductors and the sheath with a composition comprising petroleum jelly and siliceous material in an amount effective to render the petroleum jelly viscous at elevated temperatures, the siliceous material being substantially uniformly distributed throughout the petroleum jelly.

2. A method of reducing migration of a petroleum jelly filler composition into cellular insulation in a communication cable which comprises substantially uniformly distributing throughout said filler a siliceous material in an amount of 2 to 6%, by volume, of the petroleum jelly.

3. A method according to claim 2, wherein said cellular insulation is a polyolefin and said siliceous material has a relatively large surface area to mass ratio.

4. A method according to claim 3, wherein said amount of siliceous material is 2% volume to 4% volume based on the volume of petroleum jelly.

5. A method according to claim 2, wherein said siliceous material consists of submicroscopic particles having an average diameter in the range of about 70 to 140 angstroms, sintered together in a branched chain-like formation and having a surface area in the range of about 200 $m^2/g$ to 400 $m^2/g$ and said insulation is cellular polyethylene.

6. A method of stabilizing the physical and electrical properties of a communication cable, comprising a plurality of conductors electrically insulated with a cellular insulating material and surrounded by a sheath, which comprises filling the interstices between the individual cellularly insulated conductors and between the cellularly insulated conductors and the sheath with a filling composition comprising petroleum jelly having a siliceous material dispersed therein in an amount of 2 to 6%, by volume, of the petroleum jelly, the provide a filled cable.

7. A method according to claim 6, wherein said cellular insulation is a polyolefin and said siliceous material has a relatively large surface area to mass ratio.

8. A method according to claim 7, wherein said amount of siliceous material is 2% volume to 4% volume based on the volume of petroleum jelly.

9. A method according to claim 8, wherein said polyolefin is selected from the group consisting of polyethylene and polypropylene and said cellular insulation has a cell volume of 15 to 60% of the volume of the insulation.

10. A method according to claim 6, wherein said siliceous material consists of submicroscopic particles having an average diameter in the range of about 70 to 140 angstroms, sintered together in a branched chain-like formation and having a surface area in the range of about 200 $m^2/g$ to 400 $m^2/g$ and said insulation is cellular polyethylene.

11. In a method of making a communication cable comprising providing a plurality of electric conductors surrounded by a sheath wherein the conductors are electrically insulated with a cellular insulating material and filling the interstices between the cellularly insulated conductors and the sheath with a filling composition, the improvement wherein said interstices between said conductors and said sheath are filled with a filling composition which comprises petroleum jelly having a siliceous material dispersed therein in an amount of 2 to 6%, by volume, of the petroleum jelly.

12. A method according to claim 11, wherein said cellular insulation is a polyolefin selected from the group consisting of polyethylene and polypropylene, said cellular insulation having a cell volume of 15 to 60% of the volume of the insulation.

13. A method according to claim 12, wherein said siliceous material has a relatively large surface area to mass ratio and is present in said filling composition in an amount of 2% volume to 4% volume based on the volume of petroleum jelly.

14. A method according to claim 13, wherein said siliceous material consists of submicroscopic particles having an average diameter in the range of about 70 to 140 angstroms, sintered together, in a branched chain-like formation and having a surface area in the range of about 200 $m^2/g$ to 400 $m^2/g$.

* * * * *